United States Patent
Shang et al.

(10) Patent No.: US 11,115,411 B2
(45) Date of Patent: Sep. 7, 2021

(54) COMPUTE NODE AND METHOD OF SETTING UP A CLOUD CLUSTER

(71) Applicant: LENOVO ENTERPRISE SOLUTIONS (SINGAPORE) PTE. LTD., Singapore (SG)

(72) Inventors: Xiaole Shang, Shanghai (CN); Zhao Li Wang, Shanghai (CN); Li Jun Gu, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 55 days.

(21) Appl. No.: 16/567,393

(22) Filed: Sep. 11, 2019

(65) Prior Publication Data
US 2020/0128005 A1   Apr. 23, 2020

(30) Foreign Application Priority Data

Oct. 23, 2018 (CN) .......................... 201811239493.9

(51) Int. Cl.
| | |
|---|---|
| *H04L 29/06* | (2006.01) |
| *H04L 29/08* | (2006.01) |
| *H04L 12/24* | (2006.01) |
| *G06F 13/16* | (2006.01) |

(52) U.S. Cl.
CPC ...... *H04L 63/0861* (2013.01); *G06F 13/1668* (2013.01); *H04L 41/0803* (2013.01); *H04L 63/0435* (2013.01); *H04L 67/10* (2013.01); *G06F 2213/0042* (2013.01)

(58) Field of Classification Search
CPC .. H04L 67/10; H04L 63/0861; H04L 63/0435
See application file for complete search history.

(56) References Cited

U.S. PATENT DOCUMENTS

| | | | | |
|---|---|---|---|---|
| 9,525,592 | B2* | 12/2016 | Tung | H04L 41/0806 |
| 10,521,273 | B2* | 12/2019 | Mullender | G06F 9/5061 |
| 10,715,411 | B1* | 7/2020 | Da Silva | H04L 67/2833 |
| 10,979,497 | B2* | 4/2021 | Rajagopalan | G06F 11/3041 |
| 2013/0304903 | A1* | 11/2013 | Mick | H04L 67/10 |
| | | | | 709/224 |
| 2015/0236971 | A1* | 8/2015 | Sesha | H04L 43/16 |
| | | | | 709/226 |
| 2016/0019053 | A1* | 1/2016 | Gambardella | H04L 65/80 |
| | | | | 717/172 |
| 2017/0111224 | A1* | 4/2017 | Worley | H04L 41/0853 |
| 2017/0201419 | A1* | 7/2017 | Garcia | H04W 8/26 |
| 2017/0288956 | A1* | 10/2017 | Chudy | H04L 41/0883 |
| 2018/0034909 | A1* | 2/2018 | Nachimuthu | H04L 41/0813 |
| 2018/0077516 | A1* | 3/2018 | Viswanathan | H04W 4/50 |
| 2019/0294563 | A1* | 9/2019 | Remis | G06F 11/3409 |
| 2020/0228397 | A1* | 7/2020 | Chandrashekar | H04L 67/2823 |

(Continued)

*Primary Examiner* — Lashonda T Jacobs (57) ABSTRACT

A method of setting up a cloud cluster is disclosed as providing at least one compute node with a baseboard management controller (BMC), the BMC of the compute node receiving secured information and using the secured information to establish communication with a cloud controller. Upon establishing the communication, the compute node then receives a cloud operating system (OS) image from the cloud controller via the BMC of the compute node. Finally, the cloud OS image is written to a host system in the compute node. A compute node is also disclosed.

19 Claims, 6 Drawing Sheets

(56) References Cited

U.S. PATENT DOCUMENTS

2020/0249975 A1\* 8/2020 Shankara Murthy ........................ G06F 9/45558
2020/0356380 A1\* 11/2020 Kelly .................. G06F 11/3051

\* cited by examiner

Prior Art

| Properties | Type | Value |
|---|---|---|
| cloud_vip | IP | 192.168.100.10 |
| cloud_uuid | UUID | 1234-a3b2-c23b... |
| cloud_pub_key | String | AAAAB3NzaC1yc2EAAA.... |
| hash_method | String | SHA256 |
| encrypt_method | String | AES256 |
| auth_type | String | 'oneshot' |
| expire_time | U64 | 1506150379 |
| signature | String | B3NzaC1yc2EAAA... |
| role | String | 'compute node' |

FIG. 6

COMPUTE NODE AND METHOD OF SETTING UP A CLOUD CLUSTER

CROSS-REFERENCE TO RELATED APPLICATION

This application claims priority from Chinese National Application Serial No. 201811239493.9, filed Oct. 23, 2018.

TECHNICAL FIELD

This invention relates to a compute node and a method of setting up a cloud cluster, in particular such a method dispensing with the use of deploy node.

BACKGROUND OF THE INVENTION

Figure 1:
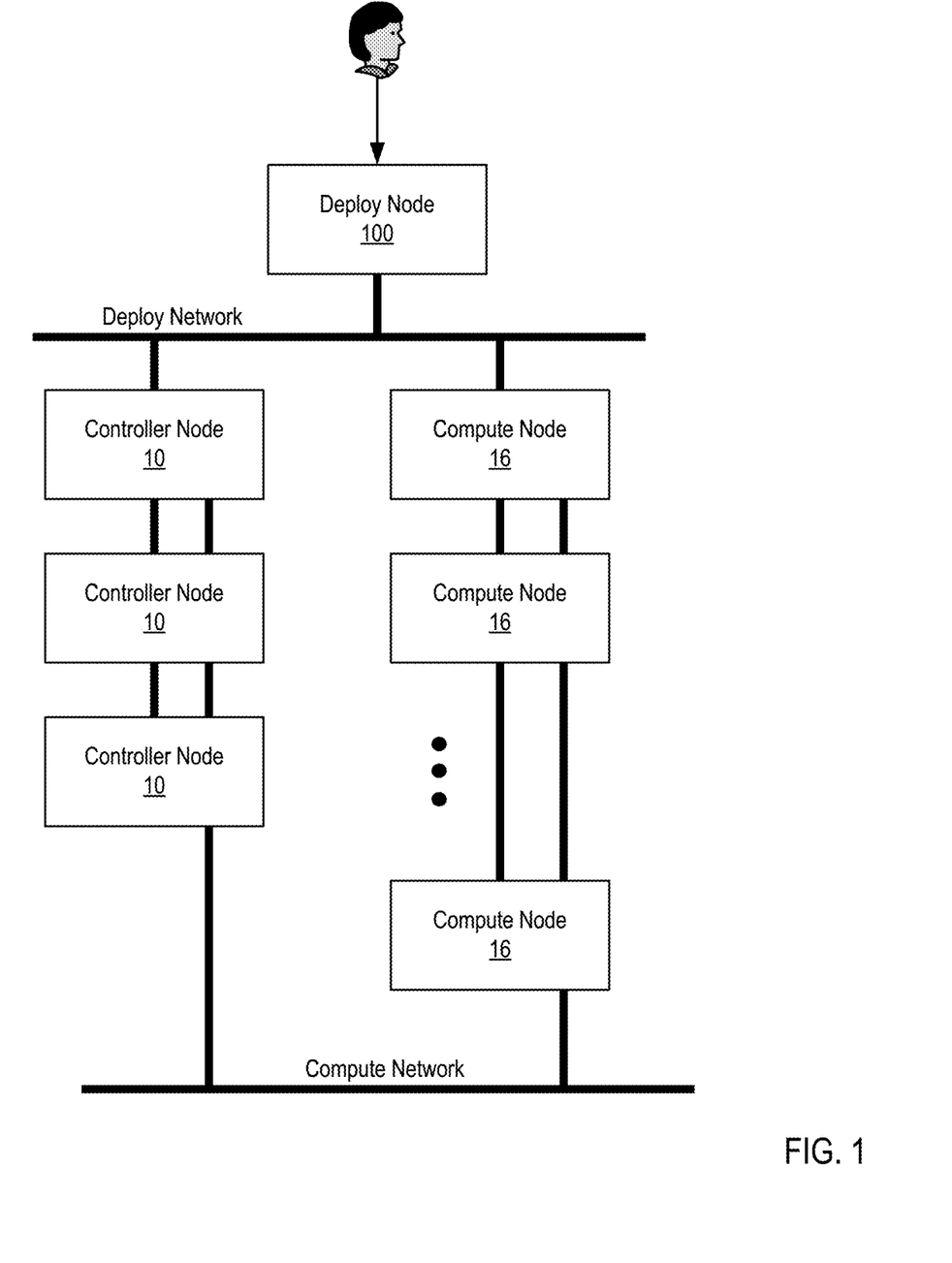
FIG. 1 shows a schematic diagram of an existing arrangement in setting up a cloud with a deploy node.

Conventionally, it is relatively difficult to set up a new cloud with many machines, network devices, and storage devices. The IT administrator usually has to have a deploy node with deployment tools to deploy the cloud. The setup lead time is usually relatively long. FIG. 1 shows a schematic diagram of an arrangement in setting up a cloud with a deploy node 100.

Figure 2:
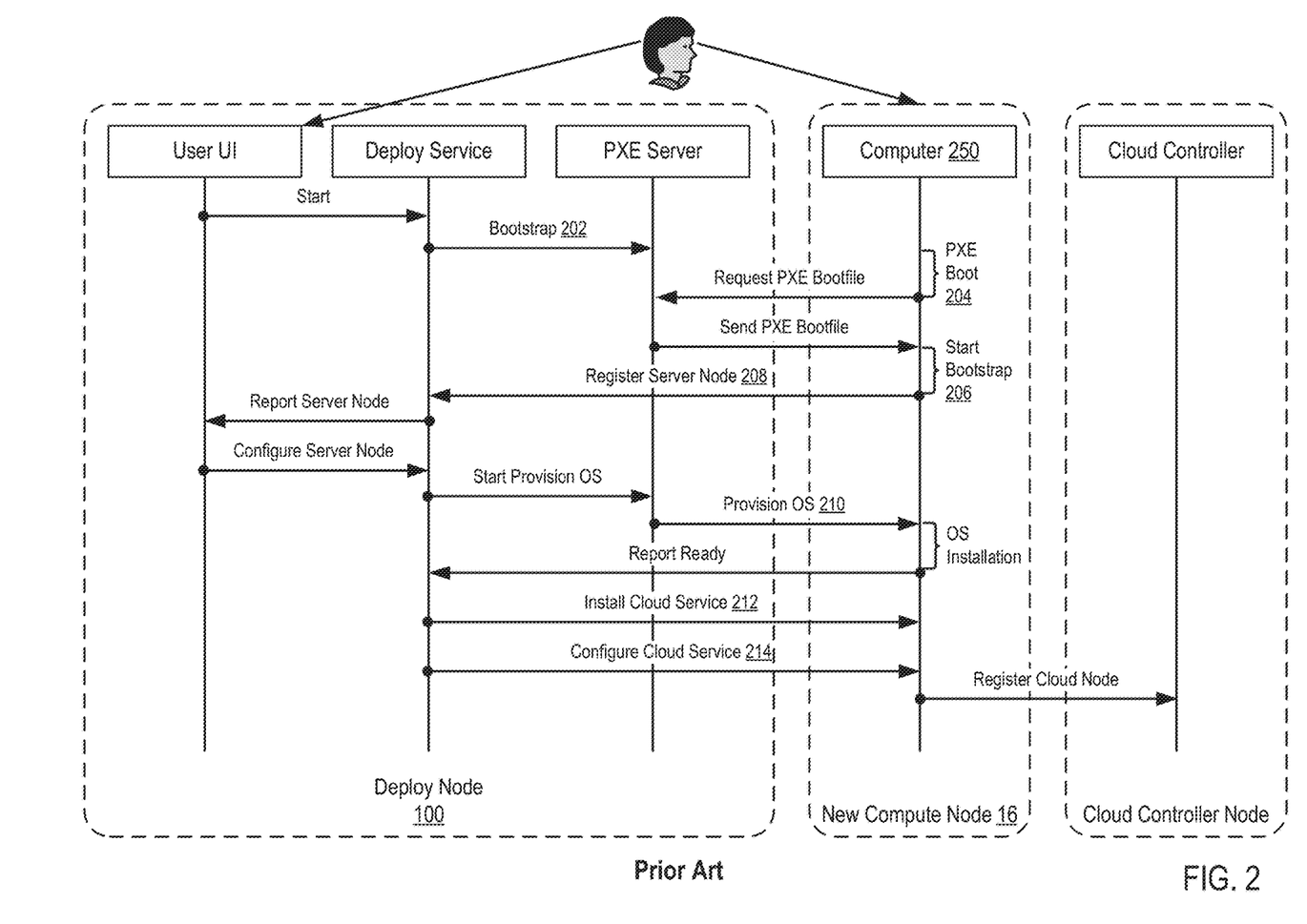
FIG. 2 shows an existing procedure for setting up a new compute node in a cloud.

In particular, and as shown in FIG. 2, to set up a cloud, an IT administrator has to:
(a) install a deploy node 100,
(b) in the deploy node 100:
(c) launch 202 a preboot execution environment (PXE) and boot 204 the cloud nodes 250 with a special image,
(d) the cloud nodes 250 run 206 the image and register 208 themselves to the deploy node 100,
(e) provision 210 an operation system (OS) to the cloud nodes 250,
(f) install 212 cloud management software in the cloud nodes 250,
(g) configure 214 cloud services to make all nodes work properly, and
(h) after completion of the setup, shutdown the deploy node 100, and store the deploy node image somewhere.

To add a new node, the IT administrator has to:
(i) restore the deploy node 100,
(j) carry out steps similar to (b)(i) to (v) above in the deploy node 100, and
(k) after completion of setting up the new node, shutdown the deploy node 100, and store the deploy node image somewhere.

The existing method suffers from the following shortcomings and/or inconveniences:
(l) An extra deploy node is required. In large scale cloud cluster deployment, it has to be a physical node.
(m) While the deploy node is usually less protected, it has too much power in the cloud. If the deploy node is attacked, the whole cloud cluster will be controlled.
(n) An insecure protocol is used while booting and provisioning OSs (PXE boot), which allows unauthorized nodes to be added in the cloud.
(o) PXE boot requires a dedicated network, which complicates cloud network configuration.
(p) The new node enablement takes a long time, including Bootstrap time, OS provisioning time, cloud services installation time, and time for the deploy node to configure cloud services.
(q) The user also needs to do extra manual steps to add a new node, e.g. configure network interfaces, storage, etc.
(r) In case the deploy node crashes, it is very hard to manage the existing cloud, e.g. extending or replacing a node. There is no high availability (HA) protection of the deploy node.

It is thus an object of the present invention to provide a method in which the aforesaid shortcomings are mitigated or at least to provide a useful alternative to the trade and public.

SUMMARY OF THE INVENTION

According to a first aspect of the present invention, there is provided a method of setting up a cloud cluster, including receiving secured information by a baseboard management controller (BMC) of a compute node, wherein the secured information is generated by a cloud controller, and wherein the BMC uses the secured information to establish communication with the cloud controller; upon the establishment of the communication between the BMC and the cloud controller, receiving, by the compute node, a cloud operating system (OS) image via the BMC from the cloud controller; and writing the cloud OS image to a host system in the compute node.

According to a second aspect of the present invention, there is provided a compute node including a baseboard management controller (BMC), and a host system, wherein the BMC is configured to receive secured information and to use the secured information to establish communication with a cloud controller, wherein the compute node is configured, upon establishment of the communication between the BMC and the cloud controller, to receive a cloud operating system (OS) image via the BMC from the cloud controller, and wherein the host system is configured to be written with the cloud OS image.

BRIEF DESCRIPTION OF THE DRAWINGS

An embodiment of the present invention will now be described, by way of an example only, with reference to the accompanying drawings, in which.

DETAILED DESCRIPTION OF THE EMBODIMENT

Figure 3:
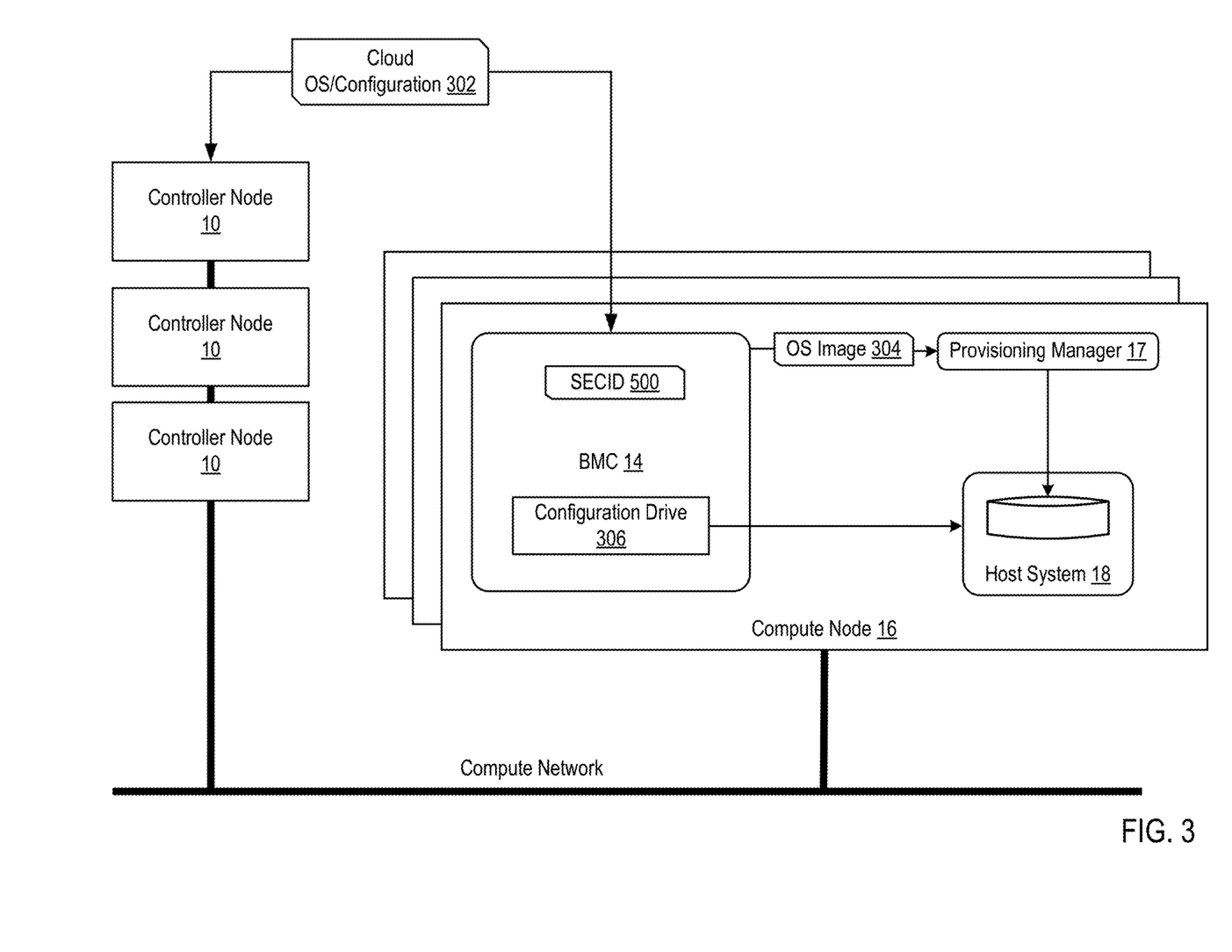
FIG. 3 shows a schematic diagram of an arrangement in setting up a cloud according to an embodiment of the present invention.
Figure 4:
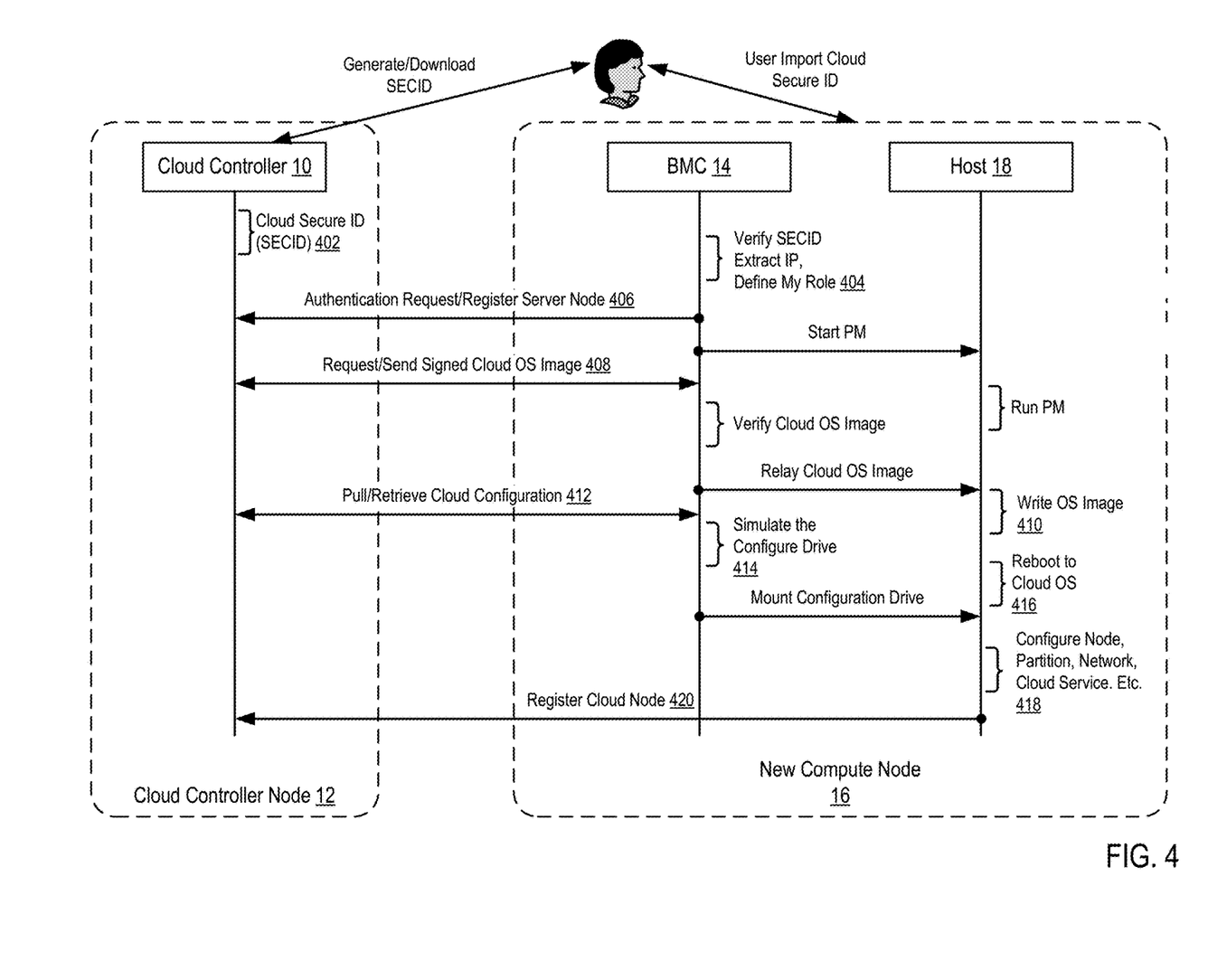
FIG. 4 shows a procedure for setting up a new compute node in a cloud according to the present invention.

A main feature in a method for setting up a cloud according to the present invention is that no deploy node is used. As shown in FIGS. 3 and 4, a cloud controller 10 in a cloud controller node 12 initializes secured information—shown in FIG. 5 as a secured identity (SECID)—which consists of the internet protocol (IP) address and other crucial information of the cloud controller 10. A human administrator uploads the SECID 500 to a BMC 14 of the new compute node 16. The BMC 14 then verifies 404 the SECID 500, extracts the IP address of the cloud controller 10, and defines its own role. The BMC 14 subsequently authenticates 406 with the cloud controller 10, such that only trusted node can be registered to the cloud cluster. It should be appreciated that the uploading of the SECID to the BMC 14 may be performed automatically instead of manually, so long as the necessary authentication is performed.

The cloud controller 10 transfers 408 a signed cloud operating system (OS) image 304 to the new compute node 16 via the BMC 14 of the new compute node 16. The provisioning manager (PM) 17 subsequently writes 410 the OS image 304 directly to the storage, e.g. a hard disk, in a host 18 of the new compute node 16. The BMC 14 retrieves 412 the cloud's configuration 302 from the cluster and simulates 414 a universal serial bus (USB) configuration drive 306 (USB drive with configuration details) to the new compute node 16. The new compute node 16 then boots up 416 and configures 418 itself by reading the configuration from the configuration drive 306. Cloud services on the new compute node 16 finish registration 420 to the cloud controller node 12.

Figure 5:
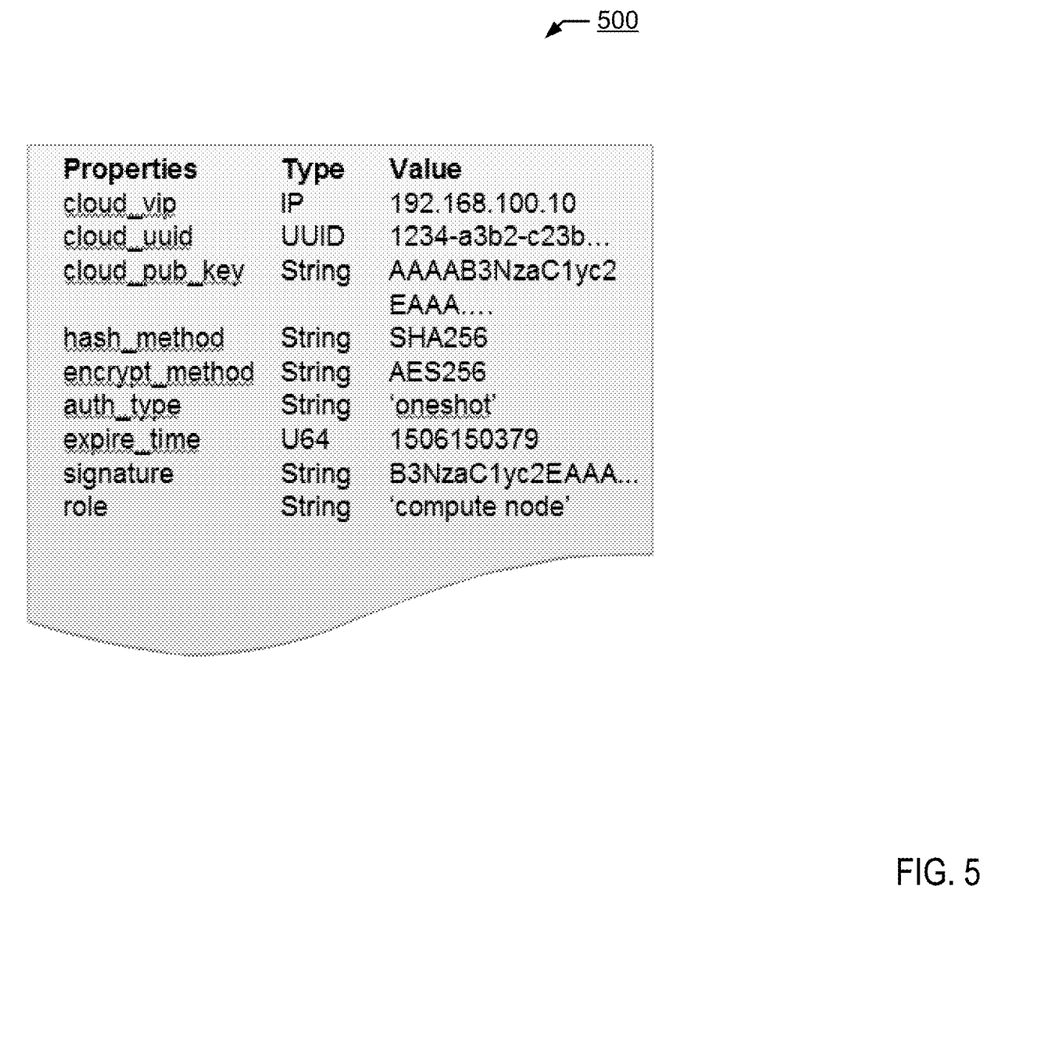
FIG. 5 shows typical information contained in a secured identity (SECID) used in a method according to the present invention.

FIG. 5 shows typical information of the SECID 500. The cloud controller 10 may generate a default SECID 500 during setup. Alternatively, the user may generate a specific SECID 500 based on requirements of different hash, encryption, or authentication types (auth_type). The authentication type can be any one of: oneshot, expiration, and batch. Signatures can be calculated with specified hash methods and encrypted with asymmetric encryption.

Figure 6:
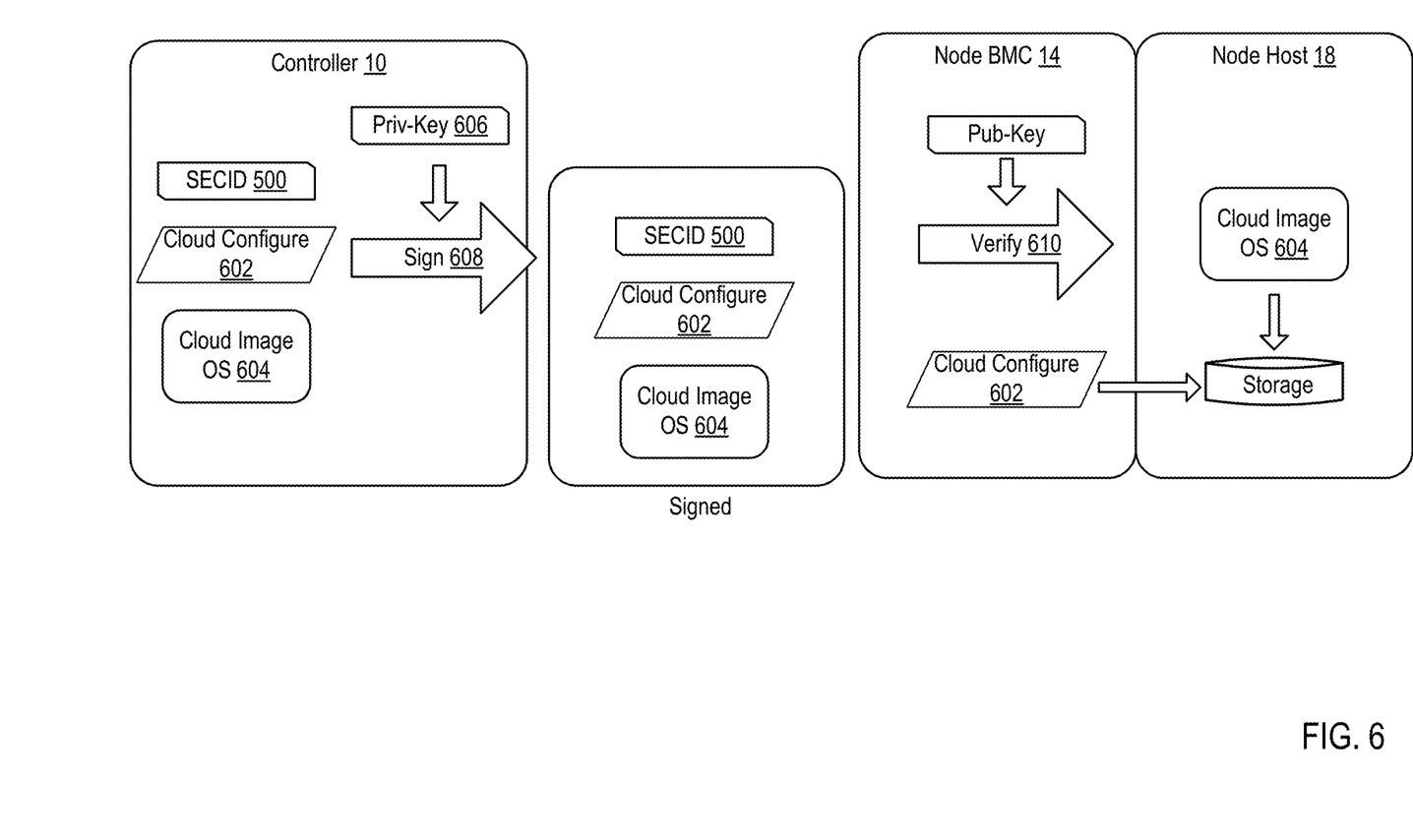
FIG. 6 shows a way in which the SECID, cloud configuration, and cloud image are signed and transferred to the new compute node in a method according to the present invention.

In order to ensure that the communication channel between cloud controller 10 and the new compute node 16 is secure, the cloud controller 10 may require the new compute node 16 to send a confirmation signal to the cloud controller 10 to confirm an absence of any unauthorized agent that may be trying to intercept information transferred between the cloud controller 10 and the new compute node 16. First, the new compute node 16 relies on the SECID 500 to locate the cloud controller 10 within the cloud cluster for communication and data transfer. Upon establishing the necessary channel for communication and data transfer, the BMC 14 of the new compute node 16 encrypts the original authentication token in SECID 500 using the controller 10's public key in SECID 500 and sends the encrypted authentication token to the cloud controller 10. Upon receiving the encrypted authentication token, the cloud controller 10 decrypts the authentication token using cloud controller 10's private key. Thereafter, the decrypted authentication token is then compared against the original authentication token in SECID 500 by the cloud controller 10. If there is a mismatch, then it suggests the presence of an unauthorized agent that may be trying to intercept information during a data transfer between the cloud controller 10 and the new compute node 16. In this case, setup of the new compute node 16 within the cloud cluster is ceased immediately. However, if there is a match, then it suggests that the communication channel between the cloud controller 10 and the new compute node is secure and that the setup of the new compute node 16 can continue without any security breach. Thereafter, the SECID 500, cloud OS image and cloud configuration are signed (encrypted) by the cloud controller 10 prior to transfer to the new compute node 16. The BMC 14 will communicate with the cloud controller 10 based on asymmetric encryption. As shown in FIG. 6, the cloud controller 10 signs/encrypts 608 the SECID 500, the cloud configuration 602 and the cloud OS image 604 by a private key 606. The thus signed/encrypted SECID 500, signed/encrypted cloud configuration 602 and signed/encrypted cloud OS image 604 are then transferred to the BMC 14 of the compute node 16. The BMC 14 then decrypts 610 the signed/encrypted SECID 500, signed/encrypted cloud configuration 602 and signed/encrypted cloud image 604 for storage in a storage of the new compute node 16. These aforesaid steps will prevent most hijack attacks from hackers. It should be appreciated that other methods of authentication and/or verification can be envisioned by a person of ordinary skill in the art.

Such a method of setting up a cloud, in particular a new compute node of a cloud cluster is faster, as there is no bootstrap step. The BMC 14 can provide the machine information which was previously provided by bootstrap, by using its agentless feature. There is no OS installation step, as the image is written by the PM directly. Several reboot cycles during the OS provisioning process are also saved. Using the simulated USB configuration drive is much faster than remotely configuring from a deploy node. In addition, the administrator can choose to use the default network interface/storage configuration to save the configuration time originally required in traditional method.

In addition to the above advantages, such a new method for deploying a new compute node in a cloud is more secured, as the SECID is stored in the BMC 14 for node authentication. By using signed SECID, signed OS image and signed configuration, security is further improved. High availability (HA) is also introduced into the deployment process. It is possible to have a plurality of (e.g. 3 or more) cloud controllers 10 in the cloud controller node 12. Thus, the failure of one cloud controller 10 will not result in cloud extending problem. Cluster deployment is more efficient and reliable with a plurality of cloud controllers 10 working concurrently.

It should be understood that the above only illustrates an example whereby the present invention may be carried out, and that various modifications and/or alterations may be made thereto without departing from the spirit of the invention. It should also be understood that various features of the invention which are, for brevity, described in the context of a single embodiment, may also be provided separately or in any appropriate sub-combinations.

The invention claimed is:

1. A method of setting up a cloud cluster, including:
receiving secured information by a baseboard management controller (BMC) of a compute node, wherein the secured information is generated by a cloud controller, and wherein the BMC uses the secured information to establish communication with the cloud controller;
upon the establishment of the communication between the BMC and the cloud controller, receiving, by the compute node, a cloud operating system (OS) image via the BMC from the cloud controller; and
writing the cloud OS image to a host system in the compute node.

2. The method according to claim 1, further including the BMC retrieving a cloud configuration from the cloud controller and simulating a universal serial bus (USB) configuration drive to the compute node.

3. The method according to claim 2, further including the compute node booting up and reading the cloud configuration in the USB configuration drive.

4. The method according to claim 3, further including the compute node registering with the cloud controller.

5. The method according to claim 1, wherein the secured information includes at least the IP address of the cloud controller.

6. The method according to claim 1, further including the BMC authenticating with the cloud controller.

7. The method according to claim 1, further comprising a provisioning manager writing the cloud OS image to the host system in the compute node.

8. The method according to claim 2, further including signing the secured information, the cloud OS image, and the cloud configuration prior to transfer to the compute node.

9. The method according to claim 8, wherein the cloud controller signs the secured information, the cloud OS image, and the cloud configuration prior to transfer to the compute node.

10. The method according to claim 1, wherein the BMC communicates with the cloud controller based on asymmetric encryption.

11. The method according to claim 10, wherein the secured information, the cloud OS image, and the cloud configuration is signed by the cloud controller using a private key.

12. The method according to claim 11, wherein the compute node decrypts the signed secured information, the signed cloud OS image, and the signed cloud configuration using a public key.

13. The method according to claim 12, wherein the BMC of the compute node decrypts the signed secured information, the signed cloud OS image and the signed cloud configuration by the public key.

14. A compute node including:
a baseboard management controller (BMC), and
a host system,
wherein the BMC is configured to receive secured information and to use the secured information to establish communication with a cloud controller,
wherein the compute node is configured, upon establishment of the communication between the BMC and the cloud controller, to receive a cloud operating system (OS) image via the BMC from the cloud controller, and
wherein the host system is configured to be written with the cloud OS image.

15. A compute node according to claim 14, wherein the BMC is configured to receive a cloud configuration from the cloud controller and to simulate a universal serial bus (USB) configuration drive to the compute node.

16. A compute node according to claim 15, wherein the compute node is configured to boot up and read the cloud configuration in the USB configuration drive, and to register with the cloud controller.

17. A compute node according to claim 14, wherein the BMC is configured to authenticate with the cloud controller.

18. A compute node according to claim 14, wherein the BMC is configured to communicate with the cloud controller based on asymmetric encryption.

19. A compute node according to claim 14, wherein the BMC is configured to decrypt a signed secured information, a signed cloud OS image and a signed cloud configuration by a public key.

* * * * *